United States Patent [19]

McCormick

[11] 4,032,672
[45] June 28, 1977

[54] METHOD FOR COATING PARTS

[75] Inventor: Harold E. McCormick, Ballwin, Mo.

[73] Assignee: Ramsey Corporation, St. Louis, Mo.

[22] Filed: Aug. 5, 1975

[21] Appl. No.: 602,110

[52] U.S. Cl. .............................. 427/34; 427/277;
427/292; 427/210; 427/300; 427/422;
427/423; 29/527.2; 29/527.4
[51] Int. Cl.² ...................... B05D 3/12; B05D 1/08
[58] Field of Search ............ 427/422, 210, 423, 34,
427/277, 292, 300; 29/527.2, 527.4

[56] References Cited

UNITED STATES PATENTS 3,097,959  7/1963  Zachman ..................... 427/300 X
3,133,341  5/1964  Marien ........................ 427/423 X

Primary Examiner—Ronald H. Smith
Assistant Examiner—Evan K. Lawrence

[57] ABSTRACT

A method for coating the faces of parts having faces and backs, includes assembling the parts so that the faces and backs thereof define two opposed coating surfaces. The parts may be staggered, and alternate parts have their faces disposed in opposite directions, with faces recessed with respect to the backs of the adjacent parts. Both coating surfaces therefore comprise a plurality of recessed part faces interspersed with part backs.

A hardenable coating such as a molten hard facing material is applied to both of the coating surfaces and allowed to harden. After hardening, the surfaces are ground to reduce the thickness of the hardened coating sufficiently to expose the part backs, leaving a desired residual layer of coating adhered to the recessed part faces. The parts are then disassembled to provide a plurality of separate parts, each having a coating on the face thereof.

12 Claims, 21 Drawing Figures

METHOD FOR COATING PARTS

BACKGROUND OF THE INVENTION

1. Field of the Invention

The invention is concerned with the art of applying coatings to parts, more particularly to the art of applying coatings to elongate parts, such as metal strips. The invention has particular application to applying hardenable metallic coatings onto strip seal members although it will be appreciated that the invention is not limited thereto but is generally applicable to coating a plurality of parts which are cabable of being assembled to form two oppositely disposed coating surfaces with the portions (faces) to be coated recessed with respect to the portions (backs) which are not ultimately to be coated. Generally, the method of the invention is applicable to elongate members having oppositely facing fronts and backs, and sides which are configured so that the parts may be assembled and held in side-by-side abutting relationship, with some part faces facing in one direction and some in the opposite direction, the parts being staggered if necessary to have the faces recessed relative to the backs.

The invention has particular applicability to the application of hardenable metallic coatings to metal strip seals such as the application of hard facing coatings to so-called side or compression seals used in rotary piston ("Wankel") internal combustion engines.

2. Description of the Prior Art

It is often desirable or necessary to apply coatings to parts, such as hard or wear-resistant coatings to metal parts to provide a wear-resistant bearing or sealing surface thereon.

Known methods of applying hard facing coatings to Wankel engine side seals provide an example of prior art methods. Such coating has heretofore been carried out by assembling a plurality of side seals, which comprise elongated arcuate metal strips, into a stack of strips. This is conveniently done by clamping strips within a clamping fixture or jig so that the faces of the strips define a coating surface onto which a suitable hard facing coating may be applied. A plasma gun or flame spraying apparatus may conveniently be used to spray a hardenable metallic coating on the strip faces. It may be that the faces to be coated contain grooves or other recesses which are to be filled with the coating while the unrecessed portions of the faces are to be free of coating. In such case, a continuous coating is applied over the surface defined by the assembled faces. The hardened coating is thereafter ground while the parts are held in place within the fixture, to reduce the thickness of the coating sufficiently to expose the unrecessed portion of the faces. This leaves a residual coating within the grooves. However, if the face of the strip is to be coated, from edge to edge, or if unrecessed edge portions are to be coated, a difficulty arises in attempting to separate the coated pieces. This is so because the coating, bridging one piece to the next piece in an unbroken layer, tends to adhere the pieces together.

One prior art expedient for overcoming this difficulty is exemplified by U.S. Pat. No. 3,337,938, and provides recessed shims or spacers between the parts to be coated so that the parts are spaced one from the other and the coating does not bridge adjacent parts. The coating is directed in a small controlled spray to avoid bridging the parts to the shims. Another prior art expedient is to utilize spacers made of berylium copper or other material which does not accept the metal coating. It will be appreciated that the use of such spacers is expensive and inconvenient, particularly since the spacers cannot be normally be reused.

Another example of a prior art expedient is set forth in U.S. Pat. No. 3,850,669, wherein cylindrical parts are assembled with cylindrical spacer plates therebetween. Both parts and spacer plates are uniformly coated. Thereafter, the coating is cracked along a predetermined line of weakness between the parts and the spacers. This involves added manufacturing steps and waste of coating material.

SUMMARY OF THE INVENTION

The present invention has for its principal object the provision of a novel and efficient coating method which overcomes the foregoing and other shortcomings of the prior art.

The present invention provides a method for coating the faces of parts having faces and backs and sides, in which a plurality of parts are assembled in side-by-side abutting relationship, with a first group of parts having their faces facing in one direction and a second group of parts having their faces facing in an opposite direction. The assembled parts thus form a first coating surface comprised of the faces of the first group of parts and the backs of the second group of parts, and a second coating surface comprising the faces of the second group of parts and the backs of the first group of parts. The first coating surface faces a direction generally opposite the direction in which the second coating surface faces. A continuous coating is then applied over both the first and second coating surfaces, and bridges the adjacent parts. After the coating hardens it is reduced in thickness, for example by grinding or other abrasion techniques, to an extent sufficient to expose the backs of the parts on both the first and second coating surfaces, while leaving a residual coating on the faces of the parts. This procedure is carried out on both the first and second coating surfaces. Because the grinding or other technique for reducing the thickness of the coating eliminates that portion of the coating which bridges the parts, the parts may be readily be separated one from the other after the process is completed.

When the part face is to have the residual coating uninterruptedly deposited from side edge to side edge, i.e., the face is not grooved, the parts must be staggered or off-set relative to each other so that the flat faces of the assembled parts are recessed with respect to the part backs of the same coating surface. In this manner, uniform grinding of both coating surfaces can remove substantially all the coating from the part backs, leaving a residual coating on the part faces.

The process of the invention is also applicable to cases wherein the faces of the parts contain recesses or grooves, even when the grooves extend to the edge of the face and are to be filled with the coating while the unrecessed part faces are to be free of coating.

In one preferred embodiment of the invention, elongate members are cut to length from a continuous reel of stock material, the cut members are assembled into a fixture in side-by-side abutting relationship and staggered if necessary to recess the faces with respect to the adjacent backs. The first and second coating surfaces provided by opposite sides of the assembled parts then have a continuous coating applied thereover, and after the coating hardens the hardened surfaces are reduced in thickness to expose the backs and leave a residual coating on the recessed faces on both the first and second surfaces.

The parts may be rolled to form the sides thereof into an arcuate configuration prior to assembling the parts in the fixture.

BRIEF DESCRIPTION OF THE DRAWING

The invention may be better understood with respect to specific embodiments thereof which are described hereinbelow and owith reference to the accompanying drawings which form a part hereof and wherein:

FIGS. 7 through 15 schematically illustrate the sequence of operation of the block flow diagram of FIG. 6, with FIG. 8A being a perspective view of a part to be coated in the illustrated sequence of operation;

FIG. 10 showing in end view elevation a staggering die used in the illustrated sequence of operation, and FIGS. 10A, 10B and 10C being partial views of the die and die plate portions;

FIG. 16 is a schematic perspective view illustrating the forming of material stock into arcuate strips; and FIG. 17 is a perspective view of a fixture for assembling arcuate strips.

For clarity, coatings illustrated in the drawings are shown vastly much thicker in relation to part size than they normally are. In practice, coatings such as plasma spray deposited metal coatings are deposited in thicknesses measured in thousandths of an inch. The amount of staggered off-set between parts is also shown much larger than the usual case in practice.

DESCRIPTION OF THE PREFERRED EMBODIMENTS

Figures 1, 2, 3:
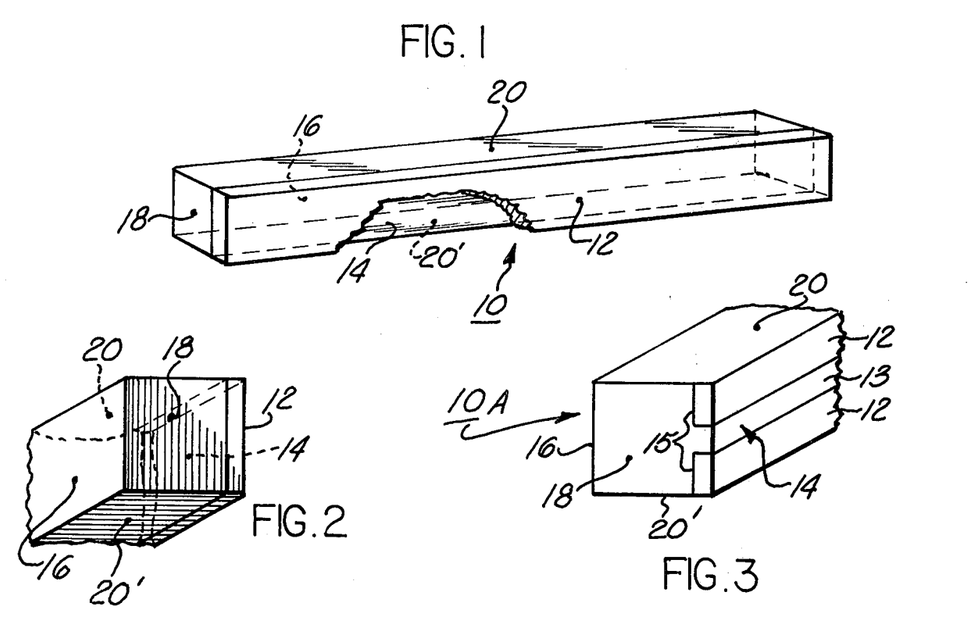
FIG. 1 is a perspective view of an elongate part having a coated face, a portion of the coating being broken away for clarity of illustration.
FIG. 2 is an enlarged partial perspective view of one end of the part of FIG. 1.
FIG. 3 is an enlarged perspective view of one end of an elongate part having shallow grooves and a land portion on its face, with a coating disposed in the grooves.

Referring to FIGS. 1 and 2, an elongate part 10, which may be made of metal, e.g., cast iron or steel, has a coating 12 on the face 14 thereof. A portion of coating 12 in FIG. 1 is broken away to better show face 14. Part 10 has a face 14 and a back 16 (FIG. 2) disposed opposite face 14, and end 18 (the opposite end not showing in FIG. 1) and sides 20, 20'. It will be noted that coating 12 extends across face 14 from the edge of side 20 to the edge of side 20'. FIG. 3 shows a somewhat similar part 10A, but one which has broad shallow grooves 15 formed in face 14, and a central ungrooved land 13. Grooves 15 are filled with coating 12, and land 13 is substantially free of coating 12.

Figure 4:
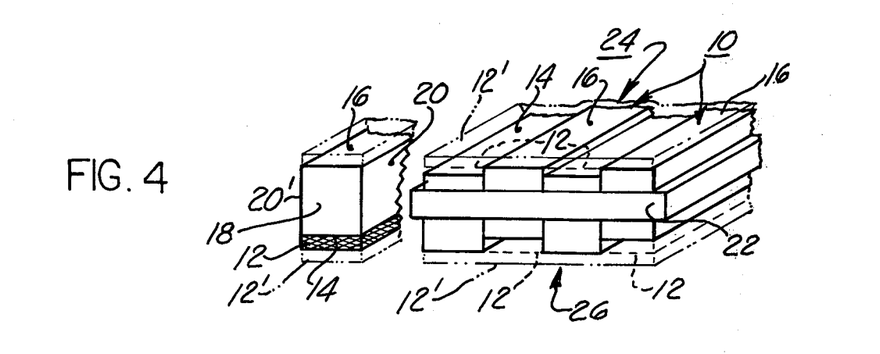
FIG. 4 is a schematic partial perspective view showing a plurality of the parts of FIG. 1 assembled for coating in accordance with the present invention, with one part separated from the assembly.
Figure 5:
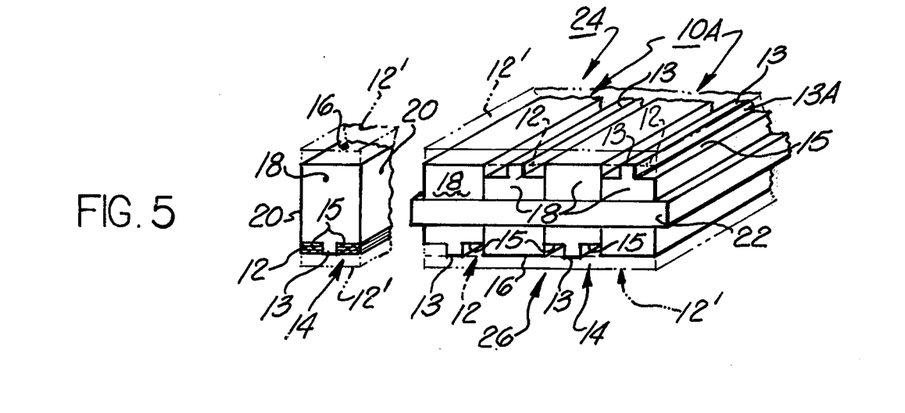
FIG. 5 is a view similar to that of FIG. 4, but showing a plurality of the parts of FIG. 3.

Coating 12 may be any suitable coating such as a metallic hard facing coating applied by plasma or flame spray techniques in a molten state, and allowed to harden in place. The hardened metallic coating may be shaped, such as by grinding, to the required finished dimensional tolerance. A plurality of parts 10 or 10A is held in an assembly of parts by means of a clamping fixture 22 as schematically illustrated in FIG. 4 and FIG. 5. As seen in the right-hand portion of FIG. 4, a plurality of parts 10 are assembled in side-by-side abutting, staggered relationship and held therein by a fixture 22. Fixture 22 may be any suitable form of jig or clamp to hold the parts together. As assembled, the abutted, staggered parts 10 provide a first coating surface 24 and a second coating surface 26. A continuous coating 12' (shown in dot-dash outline in FIG. 4) is applied to, respectively, first and second coating surfaces 24, 26 by any suitable means. Continuous coatings 12' are then reduced in thickness to define coatings 12 (shown in dotted outline in FIG. 4) which are the desired residual coatings left on faces 14. Backs 16 have been substantially cleared of coating 12' by the thickness-reduction step. As shown by the left-hand portion of FIG. 4, after removal of individual parts 10 from fixture 22, parts 10 are attained having the desired coating 12 on the faces 14 thereof, and having the backs 16 clear of coating.

FIG. 5 similarly shows assembly of parts 10A and indicate by a dotted line deposition of continuous coatings of 12' on both the first coating surface 24 and second coating surface 26 thereof. It will be noted that parts 10A are disposed in abutted side-by-side relationship but are not staggered with respect to each other. That is, the tops 13a of lands 13 are aligned with backs 16 so staggering is not necessary to properly align the parts. After reduction in thickness of coating 12' to leave residual coatings 12 in the grooves 15 of faces 14, individual parts 10A are separated from the assembly, as indicated by the left-hand portion of FIG. 5, and have the desired residual coatings 12 thereon.

The described techniques obviously apply to any size of parts, but are particularly convenient when parts 10 or 10A are relatively small, such as side seals for rotary piston engines, and a large number of such parts are to be coated.

The method of the invention thus provides parts assembled to form two oppositely disposed coating surfaces upon which an initial continuous coating may be deposited, and then reduced in thickness to provide a plurality of parts coated on their faces but not on their backs, which coated parts may readily be removed from fixture 22 since they are not bridged over by the coating. It will be appreciated that the application of a continuous coating over a plurality of parts greatly facilitates the operation as compared to coating individual parts or controlling carefully deposition of coatings on certain areas only.

Figure 6:
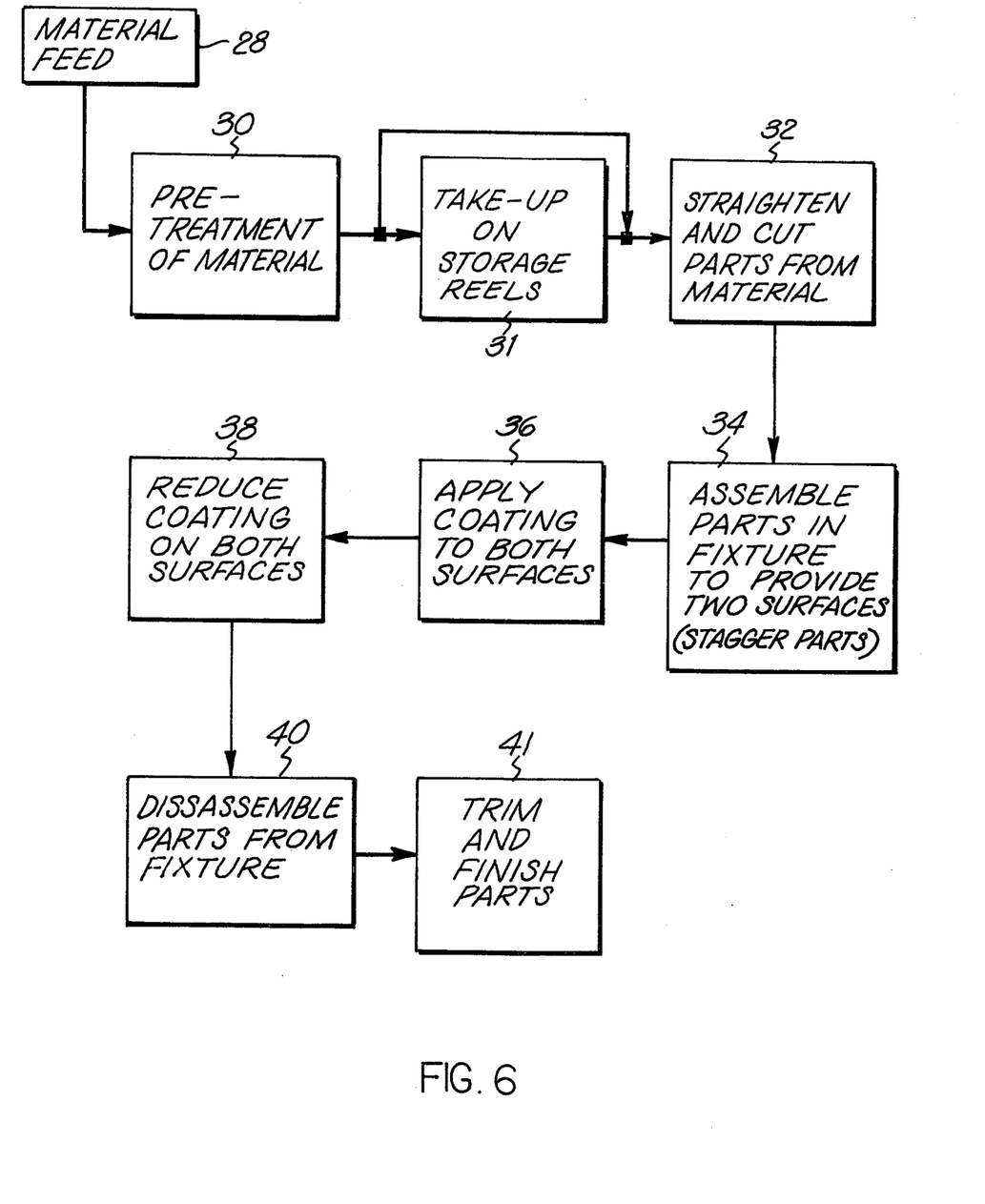
FIG. 6 is a block flow diagram illustrating a method in accordance with the invention.

Referring now to FIG. 6, a method in accordance with the invention is illustrated by block flow diagram wherein 28 represents a material feed supplying stock from which the parts are to be made. Flow of material is as indicated by the arrows. Block 30 indicates pretreatment of the material received from block 28, which pre-treatment may include heat treatment, grinding, surface preparation or any requisite treatment of the material. After pre-treatment, the material may be taken up for storage as shown by block 31. In the case of continuous elongated stock, this may be done on a take-up or storage reel. As shown by the alternate arrow paths from block 30 to 31, storage block 31 may be by-passed, and the pre-treated material moved directly to the next step represented by block 32. Block 32 represents the following step of straightening the pre-treated material (which may be considered as the last pre-treatment step) and, cutting of parts from the material. Generally this next step may be any cutting, stamping or other operation which provides a plurality of parts from the material. (Naturally, as an alternative, the material could be supplied as individual parts from material feed 28.) Block 34 represents the assembly of the individual parts into a fixture so that the parts are retained in side-by-side abutting relationship to define first and second coating surfaces. Depending on the face configuration, the parts may be staggered, as shown in FIG. 4 so that faces 14 are recessed with respect to adjacent backs 16 on both first and second coating surfaces 24, 26. As indicated by block 36, a continuous coating is then applied over both first and second coating surfaces 24, 26. After the coating has hardened and as indicated by block 38, the depth of the coating is reduced on both first and second coating surfaces. This may conveniently be accomplished by grinding or other machining operations and is carried out to substantially completely expose backs 16 by freeing them of coating deposited thereon. After the coatings 12' have been sufficiently reduced in thickness, parts 10 or 10A are disassembled from the fixture, as indicated by block 40. Post-treatment such as final trim and finish of the individual parts, if necessary, may be carried out as shown by block 41.

Figure 7:
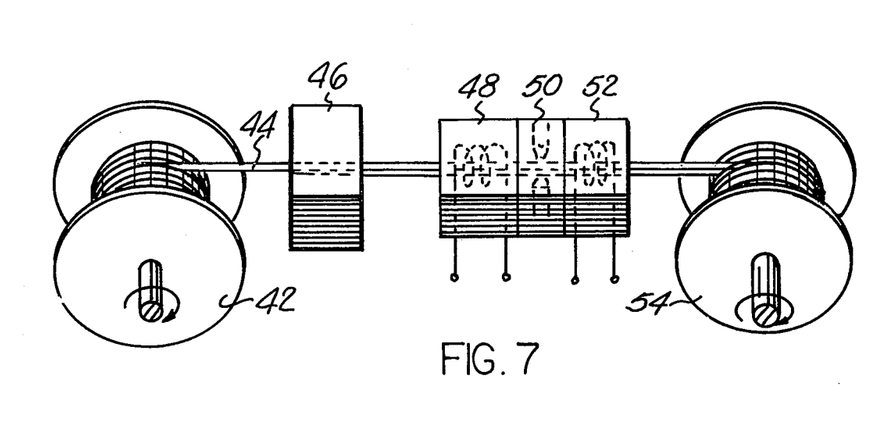

Referring now to FIG. 7, a schematic illustration of the method steps corresponding to blocks 28 through 30 of FIG. 6 is shown. A reel 42 of strip-like material 44 (e.g., a steel strip) is subjected to pre-treatment which, in the case illustrated, includes drawing strip material 44 through a drawing die 46 to provide a suitable profile to material 44. This may include forming shallow grooves like grooves 15 in FIG. 3. The next pre-treatment step comprises a heat treating process of hardening and drawing by passing material 44 through an induction coil heater 48. Heated material 44 is then passed through a spray quench 50 wherein material 44 is cooled by spraying a coolant liquid such as oil or water thereon. After cooling, material 44 is passed through a second induction coil heater 52. Although the material could now be passed directly to the next processing step, FIG. 7 shows the pre-treated material being taken up on a storage reel 54.

Figure 8:
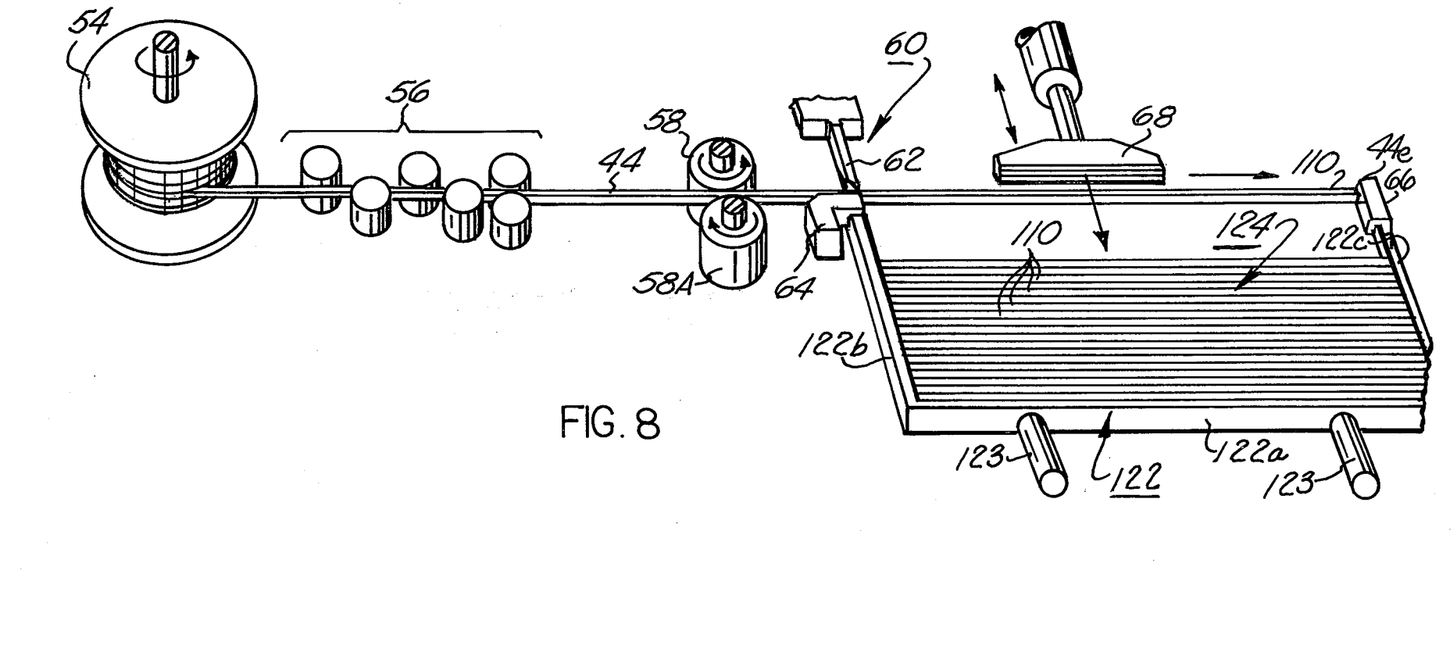
Figure 8A:
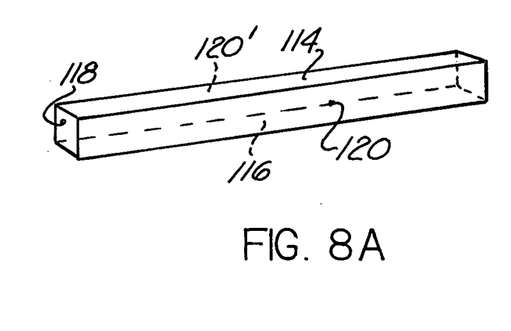

Referring now to FIG. 8 which illustrates schematically the method steps corresponding to block 32 of FIG. 6, material 44 is shown as being unwound from storage reel 54 and fed to straightening rollers 56. The straightening provided by rollers 56 would comprise the last part of the pre-treatment of FIG. 7 if the storage step were being omitted. A pair of feed rollers 58, 58A feed the pre-treated, straightened material to a cutting device 60. The leading edge 44e of strip material 44 is advanced by feed rollers 58, 58A until it abuts a stop 66 positioned to pass a suitable length of material 44 past cutting device 60. Cutting device 60 includes a cutter 62 which operates against an anvil 64 to cut segments from material 44. These segments comprise parts 110 having, as illustrated in FIG. 8A, a face 114, a back 116 and sides 120, 120'.

A pusher 68 directs part 110 into a fixture 122, with sides 120, 120' of parts 110 in abutting contact with each other, and faces 114 and backs 116 exposed to form surfaces 124, 126. Fixture 122 comprises a generally rectangular frame having a base 122a and sides 122b, 122c. Fixture 122 can also be equipped with handles 123 to facilitate handling thereof.

Figures 9, 10, 16, 17:
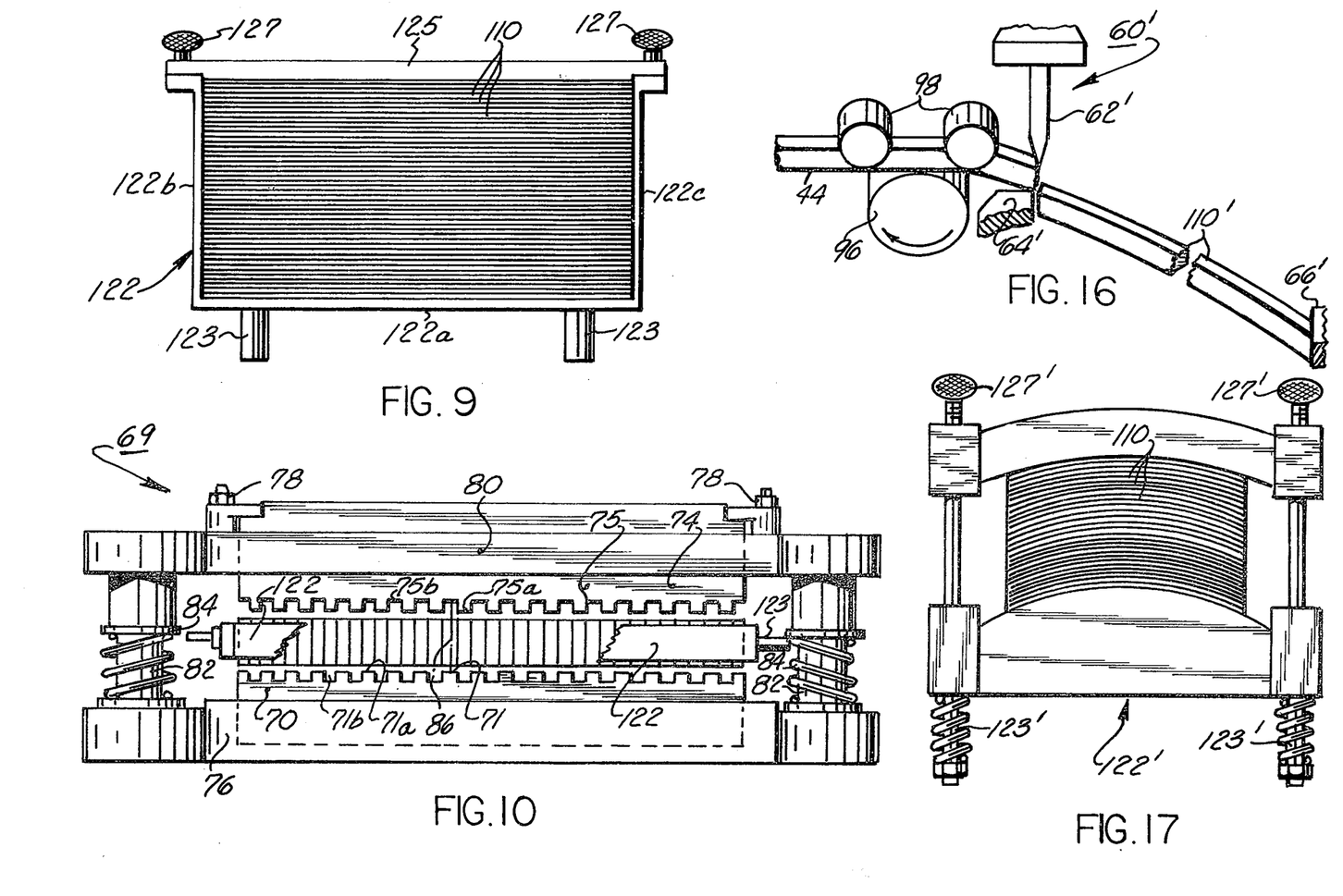

As shown in FIG. 9 (which, with FIG. 10, schematically illustrates the method steps corresponding to block 34), after fixture 122 is filled with parts 110, a locking bar 125 is attached to fixture 122 by means of lock nuts 127. Locking bar 125 holds parts 110 within fixture 122 securely enough to retain them therein but lock nuts 127 are only moderately tightened so that parts 110 may still move relative to each other under the action of a suitable staggering die.

Referring now to FIG. 10, Fixture 122 has parts 110 assembled therein in side-by-side abutting arrangement. Parts 110 as illustrated are substantially rectangular in cross section as there is no differention between faces 114 and backs 116. Obviously, if there are inherent differences (such as grooves like grooves 15) which determine which side of the part is the face 114 and which is the back 116 of parts 110, the parts must be properly arranged by hand or suitable mechanical device with some (e.g., alternate) parts having their faces facing in one direction and other parts having their faces facing in the opposite direction.

As shown in FIG. 10, fixture 122 (parts of which are broken away in FIG. 10 for clarity of illustration) is placed between a lower die plate 70 having a tooth-like pattern 71 formed thereon and an upper die plate 74 having a tooth-like pattern 75 formed thereon. Lower die plate 70 is received within die bed 76 and upper die plate 74 is secured, by means of fasteners 78, within die head 80. Die posts 82 have coil springs 84 assembled thereon which support die head 80 above die bed 76. (FIG. 10 and FIG. 10A)

Figure 10A:
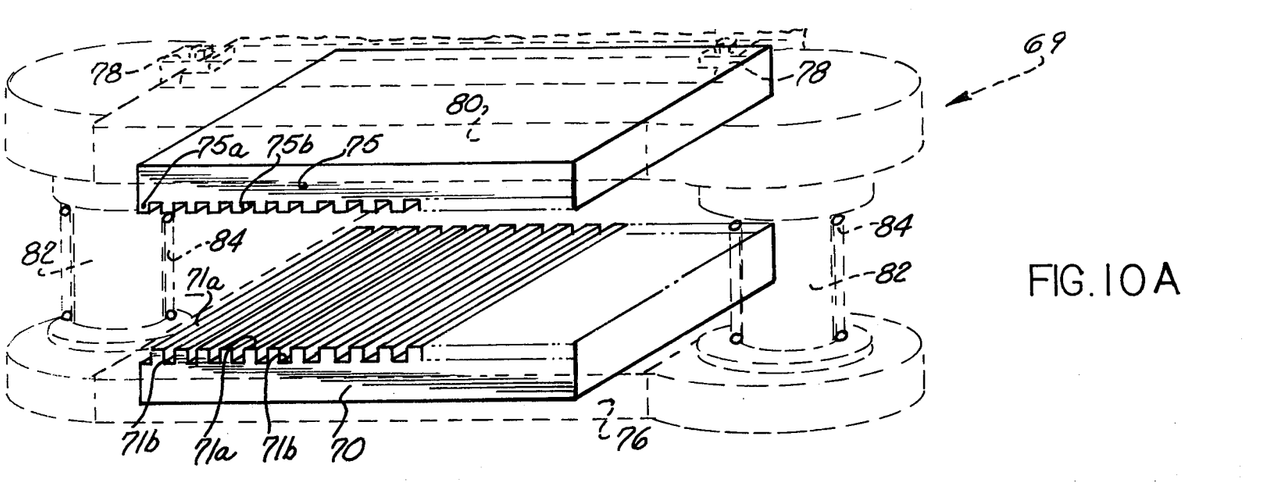

Tooth-like pattern 71 of lower die plate 70 comprises longitudinally extending teeth 71A separated by longitudinally extending recesses 71B (FIG. 10 and FIG. 10A). Similarly, tooth-like pattern 75 on upper die plate 74 comprises a longitudinally extending teeth 75A and longitudinally extending recesses 75B. As indicated by a dotted line 86 in FIG. 10, the longitudinal center line of teeth 75 are aligned with the longitudinal center line of recesses 71B, so that an offset staggered pattern is provided.

Figure 10B:
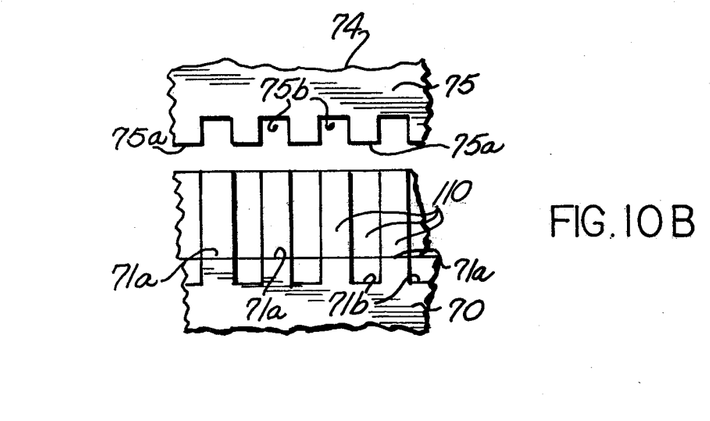

As shown in FIG. 10A, lower die plate 70 and upper die plate 75 provide a pattern of teeth and recesses which is substantially coextensive with parts 110 held within fixture 122. The pattern provided comprises a series of longitudinally extending teeth 71A separated by longitudinally extending recesses 71B in lower plate 70, and corresponding teeth and recesses 75A and 75B in upper plate 75. Teeth 71A, 75A and recesses 71B, 75B are of identical width, recesses 71B and 75B being wide enough to snugly receive therein faces 114 or backs 116 of parts 110. Thus, lower die plate 71 and upper die plate 75 are substantially identical, except for being offset as described above. While for clarity of illustration, fixture 122 is shown in FIG. 10 as suspended between lower plate 70 and upper die plate 74 as, it might temporarily be while being inserted into die 69, FIG. 10B shows the parts 110 properly placed in their final position within fixture 122 (not shown in FIGS. 10B or 10C) atop lower die plate 71. As seen from FIG. 10B, alternate ones of parts 110 are supported upon and line up with teeth 71A. The remaining alternate parts 110 are suspended above recesses 71B, being held in abutted side-by-side relationship with the supported ones of parts 110 by the compressive force imposed by fixture 122. Accordingly, alternate ones of parts 110 are supported upon and lined up with teeth 71A, and the remaining alternate ones of parts 110 are suspended above and aligned with recesses 71B. Those parts 110 which are supported upon teeth 71B at their lower end, as viewed in FIG. 10B, will be lined up with recesses 75B of upper die plate 74. The other alternate ones of parts 110, those suspended above recesses 71B, are lined up with teeth 75A of upper die plate 74.

Figure 10C:
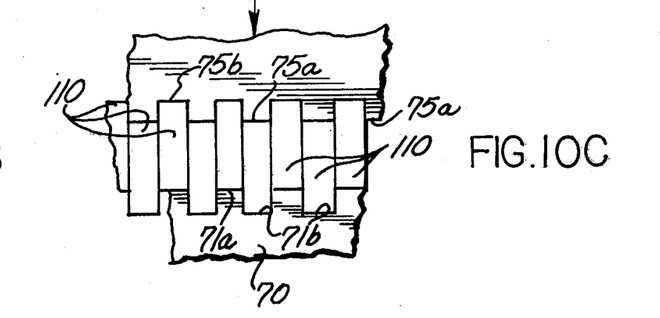
Figure 11:
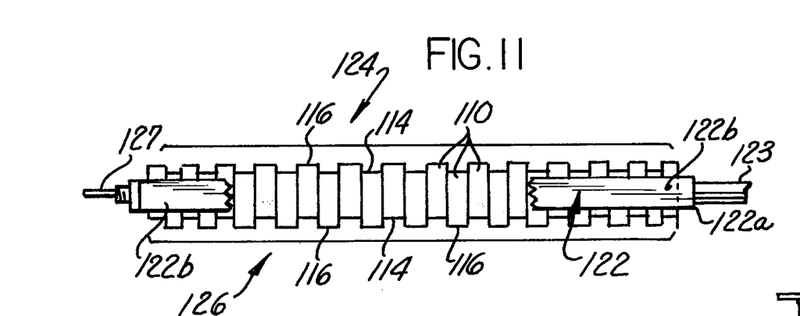

As shown in FIG. 10C, when upper die plate 72 is urged downwardly by operation of head 80, those of parts 110 which are suspended above recesses 71B will be engaged by teeth 75B and urged downwardly into recesses 71B. The parts 110 which are supported upon teeth 71A remain thereupon and have their uppermost portions engaged by recesses 75B. In this manner the staggered configuration illustrated in FIG. 11 is readily attained for the parts. After the parts are thus staggered, lock nuts 127 may be further tightened to securely retain parts 110 in their side-by-side abutting and staggered relationship. Handles 123 may conveniently be employed to help manually position fixture 122 within die 69.

Referring now to FIG. 11, parts 110 are shown held in their side-by-side abutted and staggered relationship by fixture 122. As arranged, parts 110 define first coating surface 124 and second coating surface 126.

Figure 12:
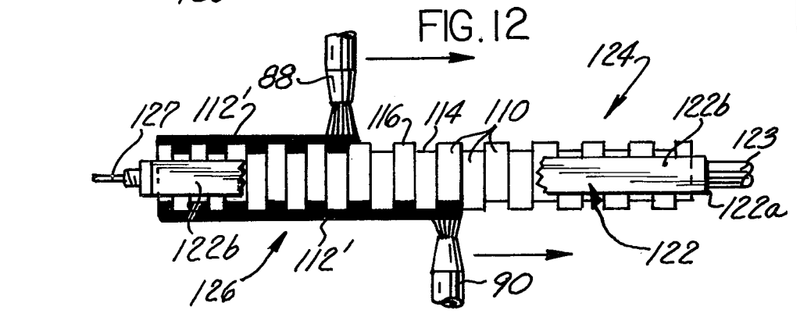

Assembled parts 110 may then be mounted in any suitable fashion on a support (not shown) so that a continuous coating 112' may be applied to both first and second surfaces 124, 126. As shown in FIG. 12 this may be accomplished by nozzles 88, 90 which spray a coating in a continuous path over first and second coating surfaces 124, 126, respectively. The continuous coating 112' bridges individual ones of parts 110 and covers both backs 116 and recessed faces 114 of parts 110. Nozzles 88, 90 may be the nozzles of plasma spray or flame spray guns or any other suitable means for applying a continuous coating, preferably a hardenable metallic coating. Instead of a single nozzle for each coating surface as shown, two or more nozzles may be used on each coating surface and, as is often the case in plasma or flame gun spraying, the two or more nozzles may direct their spray to the same location at the same time while traversing with respect to surface 124, 126.

Figure 13:
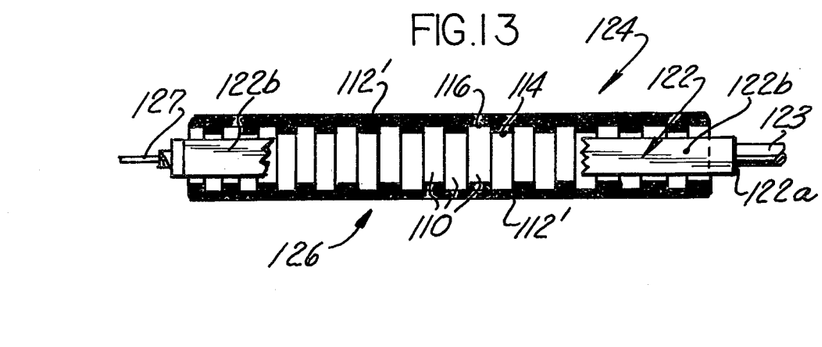

FIG. 13 shows the hardened coatings 112' applied over the parts 110 on both first and second coating surfaces 124, 126 thereof.

Figure 14:
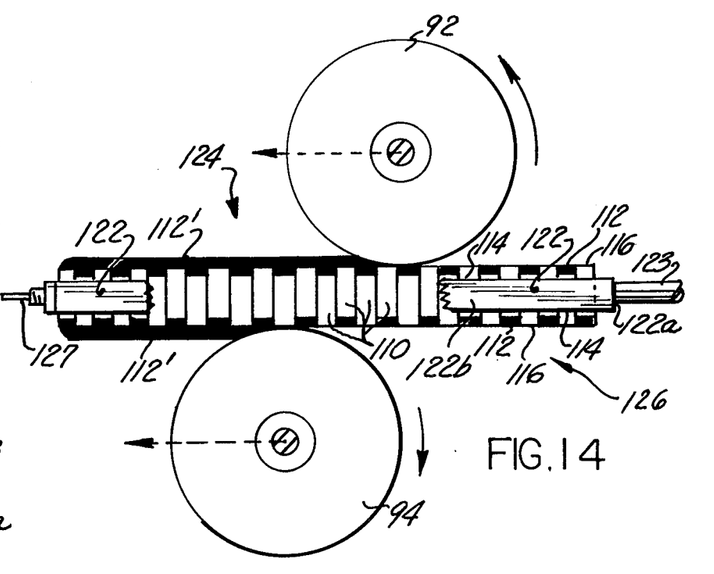

FIG. 14 shows a pair of grinding wheels 92, 94 utilized to reduce the thickness, respectively, of continuous coatings 112' deposited on first and second coating surfaces 124, 126. As shown in the right-hand portion of FIG. 14, both coatings 112' have been reduced in thickness sufficiently to expose backs 116 of parts 110 to leave behind residual coatings 112 deposited on faces 114 while backs 116 are substantially free of coating.

It will be appreciated that numerous passes of nozzles 88, 90 to apply the coating and of grinding wheels 92, 94 to reduce its thickness may be required and that other means respectively equivalent to the nozzle and grinding wheels may be used. It will also be understood that surfaces 124, 126 may be processed simultaneously or sequentially, as convenience dictates.

Figure 15:
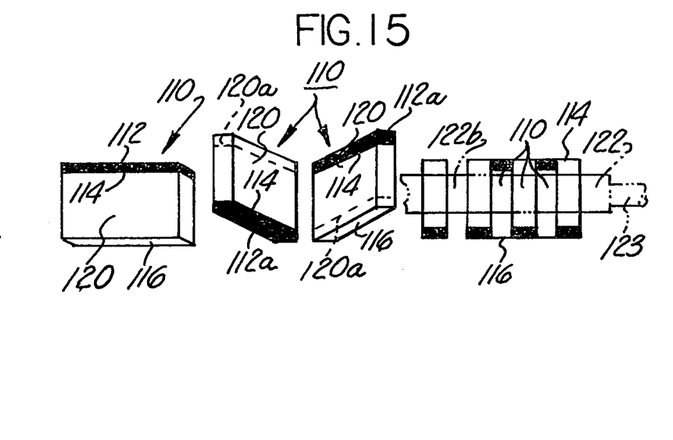

FIG. 15 schematically shows removal of parts 110 from fixture 122 (shown in partial dotted outline in FIG. 15) to provide a plurality of elongate parts 110 having backs 116 substantially free of coating and faces 114 on which the desired residual coating 112 is deposited.

Even with highly adherent coatings, the contact area between the side 112a of coating 112 and the corresponding contacted portion 120a (indicated by a dotted line in FIG. 15) of a side 120 is so small that no difficulty is encountered in separating the parts 110.

It will be apparent that parts 110, 10 or 10A may have shapes other than substantially straight segments as illustrated above. For example, as shown in FIG. 16, material 44 may be passed through bending rollers 96, 98 to bend or permanently deform stock 44 into an arcuate shape. Accordingly, segments 44', which are cut by cutter 62' acting against anvil 64' when the leading edge 44e' of stock 44' is stopped by stop 66', will have an arcuate configuration. These arcuate parts 110' may be assembled within a fixture 122' adapted to receive and retain them, as shown in FIG. 17. A staggering die having arcuate shaped teeth and recesses in the upper and lower plates thereof may be employed to stagger parts 110' in a manner similar to that shown with respect to parts 110. Arcuate seal strips are used, for example, as side seals in rotary piston ("Wankel") internal combustion engines. Arcuate or otherwise curved members can also be employed in non-circular reciprocating piston-type engines. Naturally, other suitable shapes may be required for elongate members to be coated for whatever use desired. After the coating, coating reduction and separation from the fixture 122 or 122', the members may be subjected to post treatment which may include finishing, grinding to finish tolerances, etc.

It will also be appreciated that the method of the invention is applicable to elongate members having coatings to be applied thereon to faces which have shallow grooves or recesses formed therein, as illustrated in FIG. 5 with respect to parts 10A. Grooved parts such as parts 10A may also be of arcuate rather than straight shape. "Elongate" member or part includes straight and arcuate members, grooved and ungrooved. Accordingly, the pre-treatment of material illustrated in block 30 may include suitable grooving of the material 44 to provide the broad shallow groove 15.

It will further be apparent that the provision of grooves or recesses, such as grooves 15, in which a coating is to be deposited may avoid the necessity of a separate staggering step. For example, as shown in FIG. 5, the grooved or recessed portion 15 of faces 14, within which coating is to be deposited and remain, are already recessed with respect to adjacent backs 16 in both coating surfaces 24, 26, when parts 10 are in side-by-side abutted alignment with the tops 13a of lands 13 in alignment with the surfaces of backs 16, so that the parts are not staggered with respect to each other.

While the invention has been described with respect to specific embodiments thereof, it will be apparent that upon a reading and understanding of the foregoing description numerous alterations and modifications thereto may be made which are nonetheless within the scope and spirit of the present invention. It is intended to include all such variations and alterations within the scope of the appended claims. For example, the elongate members or parts may be made of any suitable material, preferably but not necessarily metal such as cast iron or steel, ferrous materials, non-ferrous materials such as copper, bronze etc. The coatings may be any desired coating capable of being applied over in a continuous surface and thereafter reduced in thickness.

Metallic coatings such as tungsten, molybdenum, iron, nickel, chromium, etc., and alloys thereof, and compounds, (e.g., carbides) and mixtures thereof may be applied. Similarly, coatings usually referred to as ceramic coatings, such as aluminum oxide (alumina), titanium dioxide (titania), and zirconium oxide (zirconia), etc. and mixtures thereof may be applied. These coatings may be applied directly to the parts or an intermediate bond coating may be applied to help the final coating adhere firmly to the part. Typical bond coatings are nickel and aluminum containing coatings, including e.g., nickel aluminide. These coatings are preferably applied by plasma or flame spray processes. Naturally, any other methods such as electroplating, vapor deposition, etc. suitable for a given coating may be utilized. Such coatings find particular use applied to seals for internal combustion engines.

The parts to which coatings are applied may also be non-metals, for example, plastics (synthetic or natural organic polymeric material) wood or any suitable material to which a coating suitable for that material is to be applied.

What is claimed is:

1. A method of coating respective faces of a plurality of parts having a face, a back and sides wherein said sides are configured for assembly in abutting side-by-side relationship which comprises the steps of:
    assembling the parts in abutting side-by-side relationship with a first group of parts having their faces facing in one direction, and a second group of parts having their faces facing in the opposite direction so as to form a first coating surface defined by the faces of the first group of parts and the backs of the second group of parts, and a second coating surface defined by the faces of the second group of parts and the backs of the first group of parts, the faces of the first group of parts being recessed with respect to the backs of the second group of parts, and the faces of the second group of parts being recessed wth respect to the backs of the first group of parts, said parts being assembled so that each part of said first group of parts is succeeded in order by one of said second group of parts,
    applying a hardenable continuous coating to the first coating surface and applying a hardenable continuous coating to the second coating surface,
    allowing the coating to harden,
    reducing the thickness of the coating applied to the first coating surface sufficiently to remove substantially all of the coating from the backs of the second group of parts and expose the backs thereof while leaving a residual coating on the recessed faces of the first group of parts, and
    reducing the thickness of the coating on the second coating surface sufficiently to remove substantially all of the coating from the backs of the first group of parts and expose the backs thereof while leaving a residual coating on the recessed faces of the second group of parts.

2. The method of claim 1 further including staggering the assembled parts so as to recess said faces with respect to said backs in the same coating surface.

3. The method of claim 1 wherein the coating is applied to the first and second coating surfaces as a molten coating which hardens into place thereon.

4. The method of claim 1 wherein the coating is applied by plasma spray onto the first and second coating surfaces.

5. The method of claim 1 wherein the parts are elongate metal parts and the coating is a facing coating including material selected from the group consisting of metals, metal alloys, metal carbides alumina, titania, zirconia and mixtures thereof.

6. The method of claim 5 wherein the parts are internal combustion engine seals.

7. The method of claim 6 wherein the coating is applied by plasma spray onto the engine seals.

8. A method of coating the respective faces of a plurality of parts having oppositely facing faces and backs and sides, wherein said sides are configured for assembly in abutting side-by-side relationship, which comprises providing a plurality of said parts, assembling the parts in a fixture in abutting, side-by-side relationship each part having its face facing in the same direction as the back of a next adjacent part, so that the respective faces and backs define two oppositely facing coating surfaces and wherein at least a portion of each of the respective faces of said parts is recessed with respect to the back of a next adjacent part in the coating surfaces,
    applying a hardenable continuous coating to each of said two coating surfaces so that said coating bridges adjacent ones of said parts,
    allowing the coating to harden,
    reducing the thickness of said coatings so as to remove substantially all of the coating sufficiently to expose the backs of said parts in both said coating surfaces and leave a residual coating on said faces, and
    separating said coated parts from the assembly.

9. The method of claim 8 further including providing said parts by cutting said parts to length from a continuous reel of stock material.

10. The method of claim 8 wherein the entire face of a part is recessed with respect to the back of a next adjacent part in the coating surfaces.

11. The method of claim 8 wherein said recessed portions of said faces include grooves, and wherein said grooves are formed prior to applying said coating, and within which grooves said residual coating is retained.

12. The method of of claim 11 wherein said grooves are defined by lands formed on said faces, and assembling parts in abutting side-by-side relationship with the top surfaces of said lands aligned with the part backs with which they form said coating surfaces.

* * * * *